United States Patent
Wang et al.

(10) Patent No.: US 12,454,054 B2
(45) Date of Patent: Oct. 28, 2025

(54) METHOD FOR CONTROLLING ROBOT, ROBOT AND COMPUTER-READABLE STORAGE MEDIUM

(71) Applicant: UBTECH ROBOTICS CORP LTD, Shenzhen (CN)

(72) Inventors: Jiajun Wang, Shenzhen (CN); Mingguo Zhao, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 199 days.

(21) Appl. No.: 18/230,620

(22) Filed: Aug. 5, 2023

(65) Prior Publication Data
US 2023/0373089 A1 Nov. 23, 2023

Related U.S. Application Data

(63) Continuation of application No. PCT/CN2021/132997, filed on Nov. 25, 2021.

(30) Foreign Application Priority Data

Feb. 5, 2021 (CN) .......................... 202110164574.2

(51) Int. Cl.
*B25J 9/16* (2006.01)
(52) U.S. Cl.
CPC .................... *B25J 9/1661* (2013.01)
(58) Field of Classification Search
CPC ........ B25J 9/1661; B25J 9/163; B25J 9/1628; B25J 9/1602; B25J 9/16; G05B 2219/39062; G05B 2219/42156
(Continued)

(56) References Cited

U.S. PATENT DOCUMENTS

2015/0231786 A1* 8/2015 Doi ........................ B25J 9/1605
700/245

FOREIGN PATENT DOCUMENTS

CN 111618864 A 9/2020

OTHER PUBLICATIONS

Miao Songhua (CN109426560A); Task assignment method and device and computer-readable storage medium. (Year: 2019).*

(Continued)

*Primary Examiner* — B M M Hannan

(57) ABSTRACT

A method for controlling a robot includes: obtaining current motion state information of the robot and desired motion trajectory information corresponding to a target task; determining task execution coefficient matrices corresponding to the robot performing the target task according to the desired motion trajectory information and the motion state information; constructing matching dynamic constraints for task-driven parameters of the robot according to the desired motion trajectory information and the motion state information; constructing matching parameter distribution constraints for the task-driven parameters according to the motion state information and body action safety constraints corresponding to the target task; solving a pre-stored task execution loss function by using the task execution coefficient matrices to obtain the target-driven parameters satisfying the dynamic constraints and the parameter distribution constraints; and controlling operation state of each joint end effector of the robot according to the target-driven parameters.

20 Claims, 7 Drawing Sheets

(58) Field of Classification Search
USPC .......................................................... 700/245
See application file for complete search history.

(56) References Cited

OTHER PUBLICATIONS

Miao Songhua (CN109426884A); Distribution scheme determination method and device and computer-readablestorage medium. (Year: 2019).*
ISR for PCT/CN2021/132997.
Written opinions of ISA for PCT/CN2021/132997.

* cited by examiner

METHOD FOR CONTROLLING ROBOT, ROBOT AND COMPUTER-READABLE STORAGE MEDIUM

CROSS REFERENCE TO RELATED APPLICATIONS

The present application is a continuation-application of International Application PCT/CN2021/132997, with an international filing date of Nov. 25, 2021, which claims foreign priority of Chinese Patent Application No. 202110164574.2, filed on Feb. 5, 2021 in the China National Intellectual Property Administration, the contents of all of which are hereby incorporated by reference.

TECHNICAL FIELD

The present disclosure generally relates to robots, and particularly to a method for controlling a robot, robot and computer-readable storage medium.

BACKGROUND

With the continuous development of technology, the use of robots became widespread. In the practical application of robot technology, it is usually necessary to ensure that the body structure of a robot does not produce singularities during the movement process, or limit the body movement of the robot within a specific range of motion to avoid collisions between the robot and objects so as to ensure the safe operation of the robot.

Therefore, there is a need to provide a robot control method to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
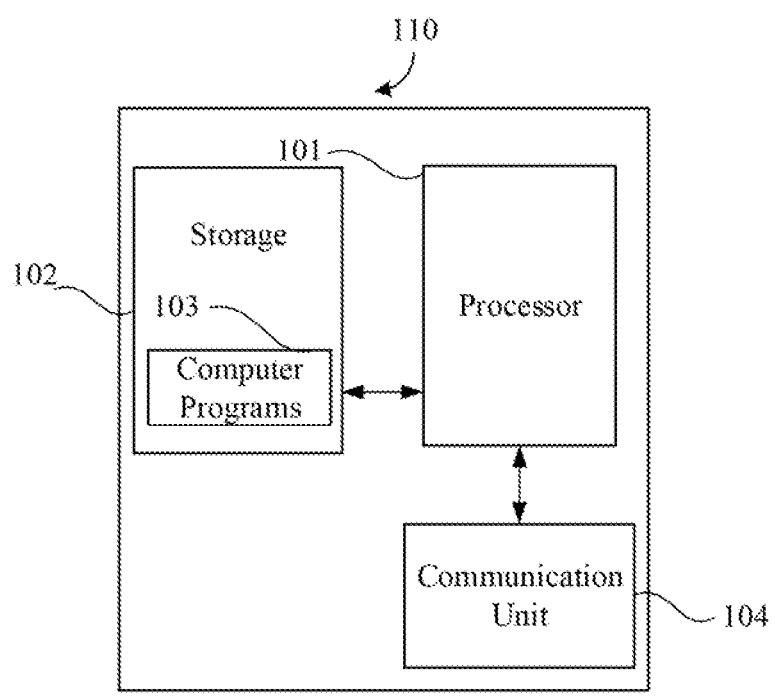
FIG. 1 is a schematic block diagram of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Some convention robot motion control schemes usually need to consider the safe motion range of the robot task space position from a global perspective, or consider the safe motion range of the robot joint position from a local perspective.

The robot motion control scheme based on the positions of the joints of a robot can be implemented in two ways. One of the implementations is to start from trajectory planning, pre-plan offline several motion trajectories that can theoretically avoid joint singularity or do not exceed the limited position range of joints, and send the motion trajectories as a command signal to the actuators of each joint of the robot to track and execute. The other implementation is to inverse kinematically calculate the desired trajectory from the workspace to the joint space, and then perform artificial truncation control.

The former implementation cannot take into account the motion status of the robot in real time, and may tend to be affected by various factors (including performance limitations of the actuators of the joints and huge interference from the external environment), making it difficult for the robot to achieve the desired motion effect in the actual control process. It is likely to cause joint singularity, causing the robot to move beyond the safe range of motion for the positions of the joints, and resulting in accidents. The latter implementation adopts a posterior truncation method. Even if it can ensure that joints avoid singularity and prevent joints from exceeding the limited position range, it often cannot guarantee the task execution effect of the workspace, that is, the desired motion effect cannot be achieved.

The robot motion control scheme based on the robot task space position can also be implemented in two ways. One of the implementations is to start from trajectory planning, pre-plan offline several motion trajectories that can theoretically avoid mechanism singularity or do not exceed a specific safe range of motion, and send the motion trajectories as a command signal to the actuators of each joint of the robot to track and execute. The other implementation is to construct an artificial potential field function in the task space, and use the virtual potential field force to softly constrain the robot's motion.

The former implementation cannot take into account the motion status of the robot in real time, and may tend to be affected by various factors (including performance limitations of the actuators of the joints and huge interference from the external environment), making it difficult for the robot to achieve the desired motion effect in the actual control process. It is likely to cause the mechanism singularity, causing the robot to move beyond the safe range of motion for the task space position. The latter implementation is overly dependent on the parameter adjustment of internal parameters. The implementation process is usually separated from the dynamic information of the robot, without taking into account the real motion status of the robot, resulting in the robot's actions not always in line with the robot's motion laws, which tends to result in accidents.

In order to ensure that the robot can achieve the desired motion effect based on the real-time state, and ensure that the robot's motion conforms to the robot's motion law, and effectively restrict the safe motion range of the robot's body motion to improve the safety of the robot's operation, embodiments of the present disclosure provide a task execution control method, robot, and computer-readable storage medium to overcome the problems of the conventional robot motion control scheme.

Embodiments of the present disclosure will be described in detail below in conjunction with the accompanying drawings. In the case of no conflict, the following embodiments and features in the embodiments can be combined with each other.

FIG. 1 shows a schematic block diagram of a robot 110 according to one embodiment. The robot 110 can realize the desired motion effect and ensure that the robot's motion conforms to the robot's motion law while effectively keeping the motion of the body of the robot within a specific safe range of motion to improve the safety of the robot's operation. The robot 110 may be, but not limited to, an industrial robotic arm, a series/parallel robot, a quadruped robot, a humanoid robot, and the like.

In one embodiment, the robot 110 may include a processor 101, a storage 102, and one or more executable computer programs 103 that are stored in the storage 102.

Figure 2:
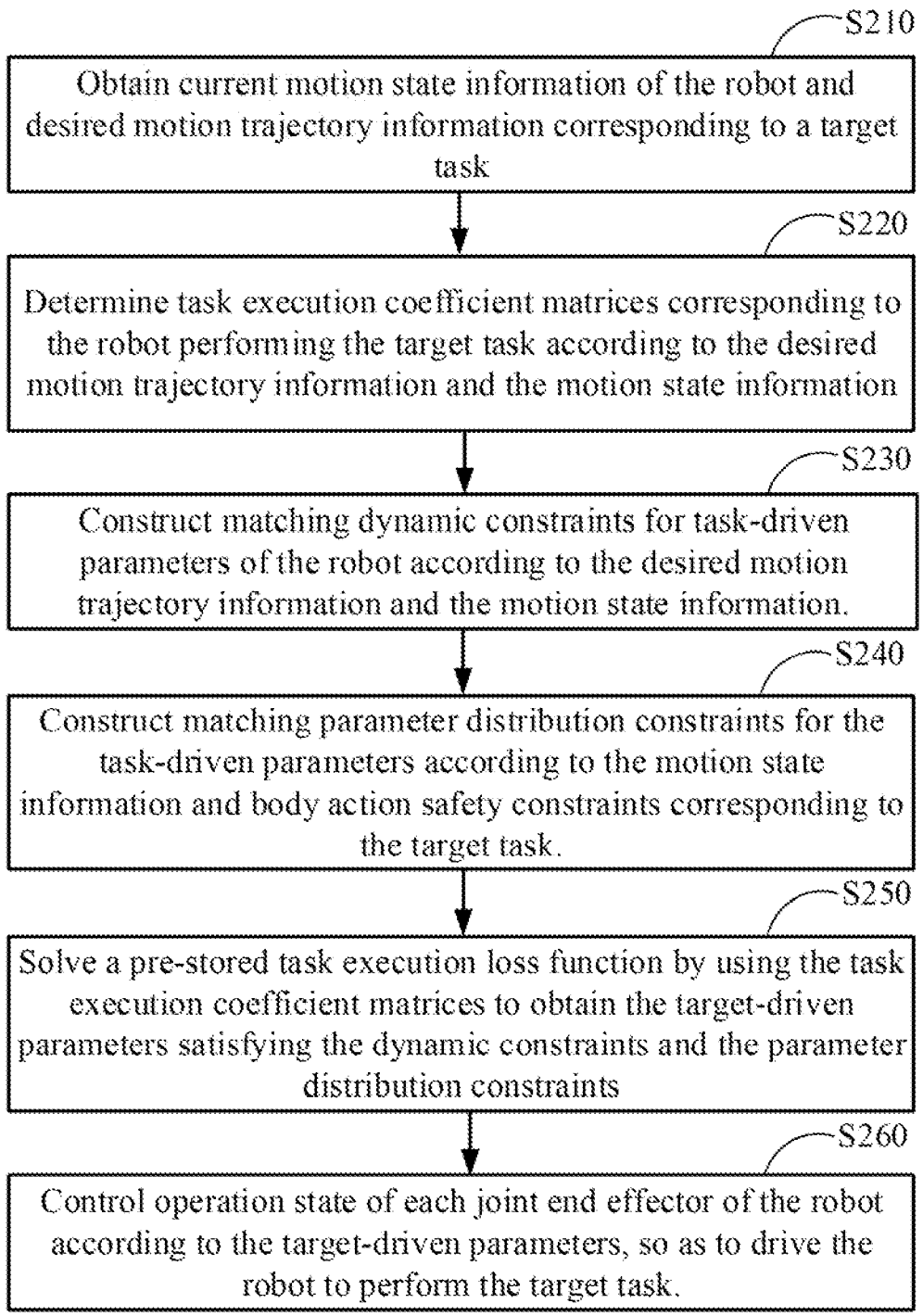
FIG. 2 is an exemplary flowchart of a method for controlling a robot according to one embodiment.

The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of the robot control method, such as steps S210 to S260 in FIG. 2 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the robot 110, such as a hard disk or a memory. The storage 102 may also be an external storage device of the robot 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the robot 110. The storage 102 can also be used to temporarily store data that have been output or is about to be output.

The storage 102 is further to store the body action safety constraints of the robot when performing different tasks. The body action safety constraints may include effective joint position constraints for the joints of the robot, and/or task space position constraints for the robot task space. The effective joint position constraints are to represent the limited range of positions for each position of the joints of the robot when the corresponding task is performed, so as to ensure that the robot body is in a safe motion state. The task space position constraints are to represent the safe motion range of the task space of the robot when the corresponding task is performed. It can be understood that the effective joint position constraints of different tasks may be the same or different, and the task space position constraints of different tasks may be the same or different.

Figure 7:
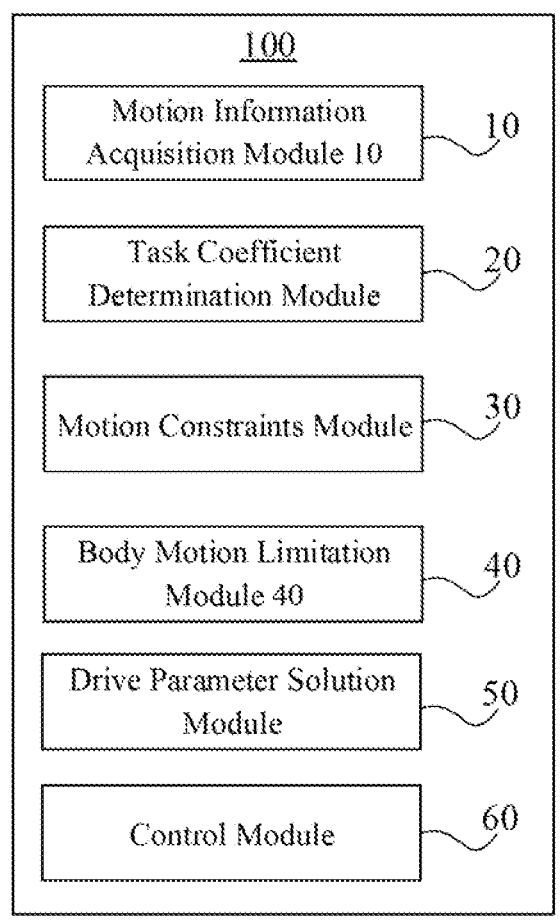
FIG. 7 is schematic block diagram of a task execution control device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 110. For example, the one or more computer programs 103 may be divided into a motion information acquisition module 10, a task coefficient determination module 20, a motion constraints module 30, a body motion limitation module 40, a drive parameter solution module 50, and a control module 60 as shown in FIG. 7. These modules are collectively referred to as a task execution control device, which will be described in detail below.

In one embodiment, the robot 110 may further include a communication unit 104 that is electrically coupled to the processor 101. The communication unit 104 is to establish a communication connection between the robot 110 and other electronic devices through a network, and send and receive data through the network. The network may include a wired communication network and a wireless communication network. For example, the robot 110 may obtain desired motion trajectory information for the robot 110 from a trajectory planning device through the communication unit 104, and receive motion control instructions through the communication unit 104, so that the robot can operate according to the motion control instructions.

In one embodiment, the task execution control device includes at least one software function module that can be stored in the storage in the form of software or firmware or solidified in the operating system of the robot 110. The processor 101 can execute executable modules stored in the storage 102, such as software function modules and computer programs included in the task execution control device. The robot 110 can effectively combine the real-time state of the robot into the control process of the robot's motion status through the task execution control device, so as to ensure that the robot can achieve the desired motion effect and ensure that the motion of robot's body conforms to the robot's motion law and is within the safe range of motion to improve the safety of the robot's operation.

It should be noted that the block diagram shown in FIG. 1 is only an example of the robot 110. The robot 110 may include more or fewer components than what is shown in FIG. 1, or have a different configuration than what is shown in FIG. 1. Each component shown in FIG. 1 may be implemented in hardware, software, or a combination thereof.

In order to ensure that the robot 110 can achieve the desired motion effect, ensure that the robot's motion conforms to the robot's motion law, and ensure that the robot's motion can be within a safe range of motion, and improve the safety of the robot's operation, embodiments of the present disclosure provide a robot control method to achieve the above-mentioned purpose. The method will be described in detail below.

FIG. 2 is an exemplary flowchart of the robot control method according to one embodiment. As an example, but not a limitation, the method can be implemented by the robot 110. The method may include the following steps.

Step S210: Obtain current motion state information of the robot and desired motion trajectory information corresponding to a target task.

In one embodiment, the motion state information can be fed back to the processor of the robot by a state estimator installed on the robot, and the desired motion trajectory information can be obtained by the processor of the robot from a trajectory planning device through the network. The specific content of the motion state information and the desired motion trajectory information matches with the type of the robot.

For example, if the robot is an industrial robotic arm, the corresponding desired trajectory information may include the desired trajectory of an end effector when the robot performs the target task, the desired contact force between a particular part (e.g., joints or the end of a robotic arm) and the external environment, and the trajectory information of the robot center-of-mass momentum. The corresponding motion state information can be related to the joints of the robot, and can also be related to the task space of the robot. The motion state information related to the robot joints can include real-time position information of each joint of the robot, real-time speed information of each joint, real-time torque information of the end effector of each joint, real-time force feedback information of the end effector, robot real-time pose information and real-time center-of-mass momentum information. The motion state information related to the task space of the robot can include real-time position information of each joint of the robot, real-time speed information of each joint, real-time position information of the task space, real-time speed information of the task space, real-time force feedback information of the end effector, real-time robot pose information, and real-time center-of-mass momentum information.

If the robot is a legged robot, the corresponding desired motion trajectory information may include the desired upper body posture trajectory information of the robot when performing the target task, the foot end workspace trajectory information, and the desired contact force between a particular part and the external environment, and the desired trajectory information of the robot's center-of-mass momentum. The corresponding motion state information can be related to the joints of the robot, and can also be related to the task space of the robot. The motion state information related to the joints of the robot can include real-time position information of each joint of the robot, real-time speed information of each joint, real-time torque information of each joint end effector, real-time force feedback information of the end effectors, and real-time robot pose information and real-time center-of-mass momentum information. The motion state information related to the task space of the robot can include real-time position information of each joint of the robot, real-time speed information of each joint, real-time position information of the task space, real-time speed information of the task space, real-time force feedback information of the end effectors, real-time robot pose information and real-time center-of-mass momentum information.

Step S220: Determine task execution coefficient matrices corresponding to the robot performing the target task according to the desired motion trajectory information and the motion state information.

In one embodiment, the task execution coefficient matrices are to represent the specific coefficient content that matches a task execution loss function when the target task is executed at the robot. The task execution loss function is to represent any task execution process at the robot with reference to the general expression of the least squares optimization equation. Its purpose is to correct the deviation between the actual motion state of the robot and the desired trajectory behavior according to the specified desired trajectory behavior. Therefore, the robot can determine the matching task coefficient content for each sub-task included in the target task according to the desired motion trajectory information corresponding to the target task and the current motion state information of the robot, and form the task execution coefficient matrices of the target task.

Figure 3:
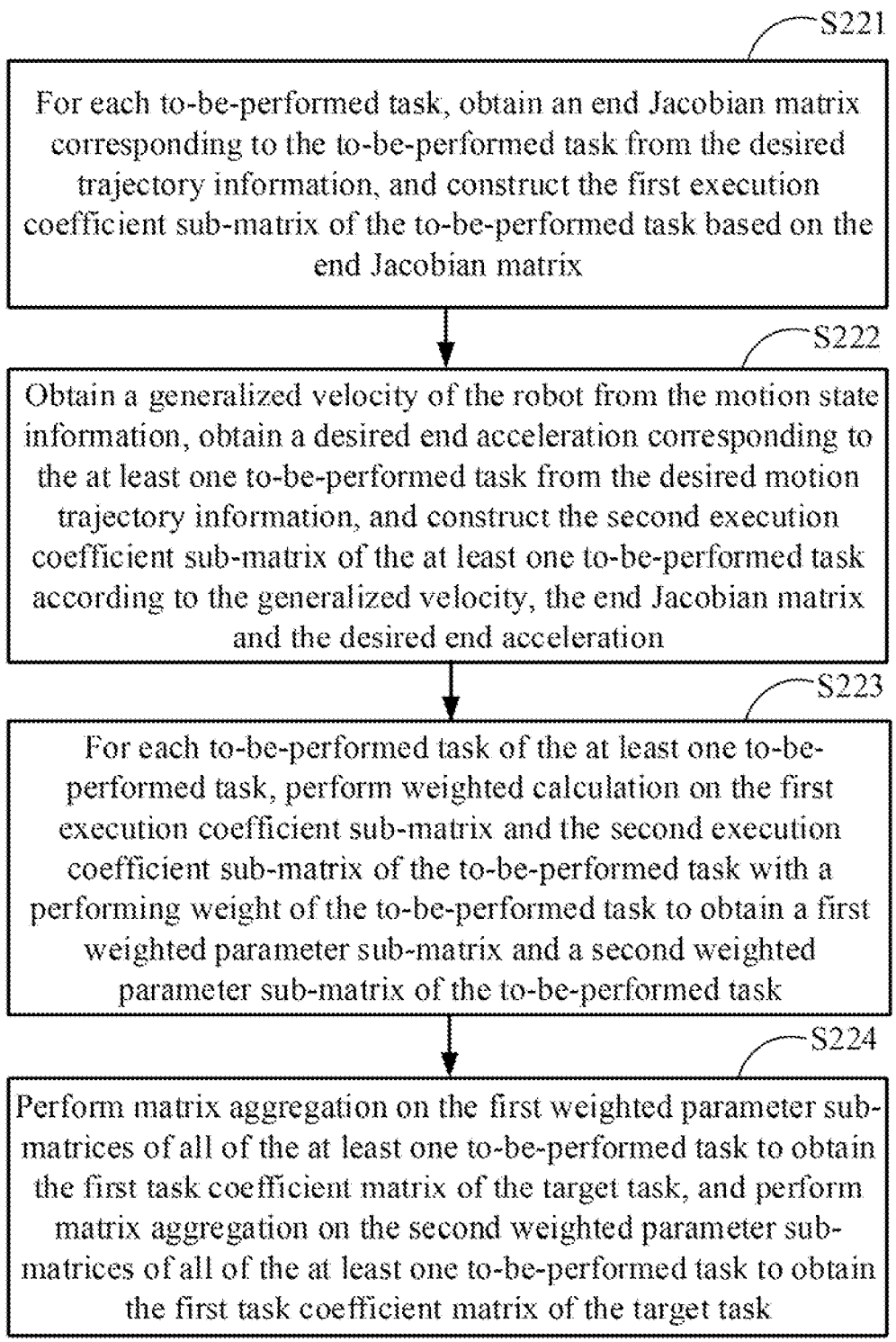
FIG. 3 is an exemplary flowchart of a method for determine task execution coefficient matrices according to one embodiment.

FIG. 3 is a schematic flowchart of sub-steps included in step S220 in FIG. 2. In one embodiment, the target task may include at least one to-be-performed task, and each to-be-executed task corresponds to an execution weight. The execution weight is to represent the execution priority of the corresponding to-be-executed task at the robot. The higher the value of an execution weight, the higher the importance of the execution of the corresponding task. The task execution coefficient matrices may include a first task coefficient matrix and a second task coefficient matrix, and the step S220 may include steps S221 to S224. The task execution coefficient matrices matching the target task are constructed through the steps S221 to S224.

Step S221: For each to-be-performed task, obtain an end Jacobian matrix corresponding to the to-be-performed task from the desired trajectory information, and construct the first execution coefficient sub-matrix of the to-be-performed task based on the end Jacobian matrix.

In one embodiment, the first execution coefficient sub-matrix is formed by splicing the end Jacobian matrix corresponding to the to-be-performed task and a zero matrix. The number of rows of the zero matrix is the same as the total number of the to-be-performed tasks included in the target task. The number of columns of the zero matrix is consistent with the robot external force dimension required for the execution of the target task. In this case, the first execution coefficient sub-matrix is to represent the coefficient content of a corresponding item of the to-be-performed task at the task execution loss function that constrains the mechanical energy of the robot action.

Step S222: Obtain a generalized velocity of the robot from the motion state information, obtain a desired end acceleration corresponding to the at least one to-be-performed task from the desired motion trajectory information, and construct the second execution coefficient sub-matrix of the at least one to-be-performed task according to the generalized velocity, the end Jacobian matrix and the desired end acceleration.

In one embodiment, the second execution coefficient sub-matrix is obtained by subtracting the product of the generalized velocity and the end Jacobian matrix from the desired end acceleration corresponding to the to-be-performed task, which is used to represent another coefficient content corresponding to the to-be-performed task at the task execution loss function. The generalized velocity is to represent the velocity of the robot at a generalized coordinate position, and the desired end acceleration can be calculated using the following equation: $\ddot{\gamma}_c = \ddot{\gamma}_c^{ref} + P(\gamma_c^{ref} - \gamma_c) + D(\dot{\gamma}_c^{ref} - \dot{\gamma}_c)$, where $\ddot{\gamma}^*_c$ represents the desired end acceleration corresponding to the to-be-performed task, $\ddot{\gamma}_c^{ref}$ represents an end acceleration reference value for the to-be-performed task given by the desired motion trajectory information $\gamma_c^{ref}$ represents a position reference value of an end working space for the to-be-performed task given by the desired motion trajectory information, $\gamma_c$ represents the real-time position of the end workspace corresponding to the to-be-performed task in the motion state information, $\dot{\gamma}_c^{ref}$ represents an end speed reference value for the to-be-performed task given by the desired motion trajectory information, $\dot{\gamma}_c$ represents the real-time end speed corresponding to the to-be-performed task in the motion state information, P represents a proportionality coefficient matrix for the to-be-performed task given by the desired motion trajectory information, and D represents a differential coefficient matrix for the to-be-performed task given by the desired motion trajectory information.

Step S223: For each to-be-performed task of the at least one to-be-performed task, perform weighted calculation on the first execution coefficient sub-matrix and the second execution coefficient sub-matrix of the to-be-performed task with a performing weight of the to-be-performed task to obtain a first weighted parameter sub-matrix and a second weighted parameter sub-matrix of the to-be-performed task.

In one embodiment, the first weighted parameter sub-matrix of each to-be-performed task is the weighted product of the execution weight of the to-be-executed task and the first execution coefficient sub-matrix, and the second weighted parameter sub-matrix of each to-be-performed task is the weighted product of the execution weight of the to-be-executed task and the second execution coefficient sub-matrix.

Step S224: Perform matrix aggregation on the first weighted parameter sub-matrices of all of the at least one to-be-performed task to obtain the first task coefficient matrix of the target task, and perform matrix aggregation on the second weighted parameter sub-matrices of all of the at least one to-be-performed task to obtain the first task coefficient matrix of the target task.

In one embodiment, after the processor of the robot determines the first weighted parameter sub-matrix and the second weighted parameter sub-matrix of each to-be-performed task included in the target task, it can aggregate the first weighted parameter sub-matrices of all to-be-performed tasks in the target task by allocating a matrix row by a single to-be-performed task within the same matrix, to obtain the first task coefficient matrix of the target task. Similarly, it can aggregate the second weighted parameter sub-matrices of all to-be-performed tasks in the target task to obtain the second task coefficient matrix of the target task.

By executing the steps S221 to S224 above, it is ensured that the constructed task execution coefficient matrices can accurately represent the interaction status between the corresponding sub-tasks of the target task during the execution process, so as to facilitate the processor of the robot to effectively integrate the real-time state of the robot into the control process of the motion condition of the robot based on the task execution coefficient matrices, thereby ensuring that the robot achieves the desired motion effect.

Step S230: Construct matching dynamic constraints for task-driven parameters of the robot according to the desired motion trajectory information and the motion state information.

In one embodiment, the dynamic constraint conditions are to represent the constraint conditions for the task-driven parameters that the robot work satisfies the dynamic laws of the robot during the motion control process of the robot. The dynamic constraints may be expressed by a full dynamic equation, or may be expressed by a center-of-mass dynamic equation. In one embodiment, the task-driven parameters may include the acceleration of the robot at the generalized coordinate position and the external force on the robot, and the dynamic constraints are expressed by a full dynamic equation. In this case, the dynamic constraints are expressed as follows: $M(q)\ddot{q} + B(q,\dot{q}) + G(q) = \tau + J_{ext}(q)^T f_{ext}$, where q represents the generalized coordinate position of the robot in the motion state information, $\dot{q}$ represents a generalized velocity of the robot in the motion state information, M( ) represents a robot inertia matrix in the desired motion trajectory information, B( ) represents a nonlinear matrix produced by centrifugal force and Coriolis force in the desired motion trajectory information, G( ) represents a gravity matrix of the robot in the desired motion trajectory information, $J_{ext}$ represents a Jacobian matrix at a point of application of external force in the desired motion trajectory information, τ represents a generalized force acting on the generalized coordinate position of the robot, $\ddot{q}$ represents the acceleration of the robot at the generalized coordinate position, and $f_{ext}$ represents the external force on the robot.

Step S240: Construct matching parameter distribution constraints for the task-driven parameters according to the motion state information and body action safety constraints corresponding to the target task.

In one embodiment, the task-driven parameters targeted by the parameter distribution constraints may include the acceleration of the robot at the generalized coordinate position. The specific implementation process of the step S240 can be adjusted accordingly depending on the type of the body action safety constraints. The specific implementation process of the step S240 may be as follows.

Figure 4:
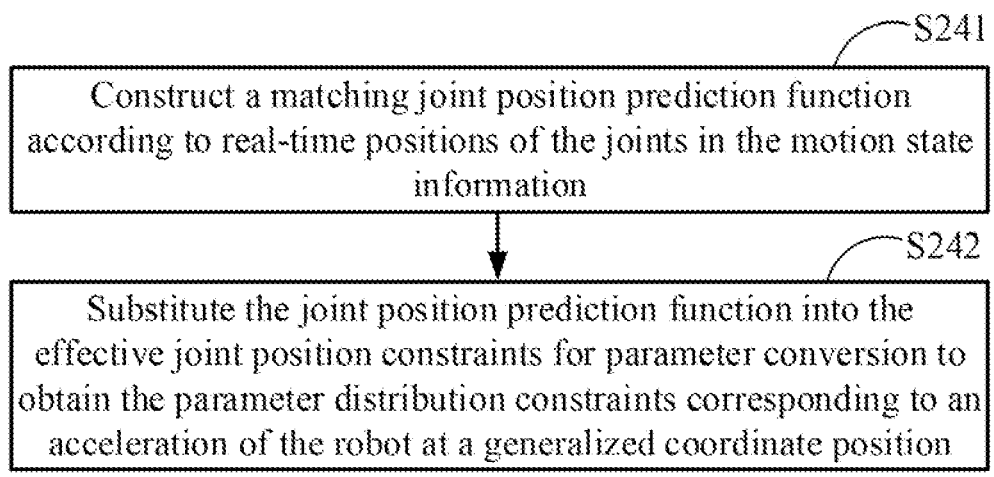
FIG. 4 is an exemplary flowchart of a method for constructing matching parameter distribution constraints according to one embodiment.

FIG. 4 is one of the schematic flowcharts of the sub-steps included in step S240 in FIG. 2. In one embodiment, if the body action safety constraints include effective joint position constraints for the joints of the robot, the step S240 may include steps S241 to S242, which are used to avoid the singularity of the joints of the robot from the dimension of generalized acceleration (i.e., the acceleration of the robot at the generalized coordinate position), keep the positions of the joints of the robot within the safe and effective position range, and avoid robot motion accidents.

Step S241: Construct a matching joint position prediction function according to real-time positions of the joints in the motion state information.

In one embodiment, the joint position prediction function may be expressed by a second-order Taylor expansion of the joint position with respect to the current moment, so as to perform joint position prediction operations based on the current motion state information of the robot. In this case, the joint position prediction function can be expressed as follows:

$$q(t) \cong q(\tilde{t}) + \dot{q}(\tilde{t})\Delta t + \frac{1}{2}\ddot{q}(\tilde{t})\Delta t^2, t = \tilde{t} + \Delta t,$$

where q(t) represents a predicted joint position at moment $\bar{t}$, q($\bar{t}$) represents a real-time joint position at a current moment $\bar{t}$, $\Delta t$ represents a preset time interval, $\dot{q}(\bar{t})$ is a first derivative of q(t) and represents a joint velocity at the current moment $\bar{t}$, $\ddot{q}(\bar{t})$ is a second derivative of q(t) and represents a joint acceleration the current moment $\bar{t}$.

Step S242: Substitute the joint position prediction function into the effective joint position constraints for parameter conversion to obtain the parameter distribution constraints corresponding to an acceleration of the robot at a generalized coordinate position.

In one embodiment, the effective joint position constraints can be expressed by [$\theta_{min}$, $\theta_{max}$], where $\theta_{min}$ represents a joint position lower limit in the effective joint position constraints, and $\theta_{max}$ represents a joint position upper limit in the effective joint position constraints.

After the joint position prediction function is substituted into the effective joint position constraints, the effective joint position constraints condition can be transformed into the following equations, and the equations are used as the parameter distribution constraints corresponding to the acceleration of the robot at the generalized coordinate position. The equations are as follows:

$$lb_\theta \leq C_\theta \ddot{q} \leq ub_\theta;$$

$$\begin{cases} C_\theta = \frac{1}{2}\Delta t^2 \\ lb_\theta = \theta_{min} - q - \Delta t \dot{q} \\ ub_\theta = \theta_{max} - q - \Delta t \dot{q} \end{cases},$$

where $\ddot{q}$ represents an acceleration of the robot at the generalized coordinate position, $\dot{q}$ represents a generalized velocity of the robot in the motion state information, q represents a generalized coordinate position of the robot in the motion state information, $\theta_{min}$ represents a joint position lower limit in the effective joint position constraints, and $\theta_{max}$ represents a joint position upper limit in the effective joint position constraints.

By executing the steps S241 and S242, it can avoid the singularity of the joints of the robot from the dimension of generalized acceleration, keep the positions of the joints of the robot within the safe and effective position range, and avoid robot motion accidents.

Figure 5:
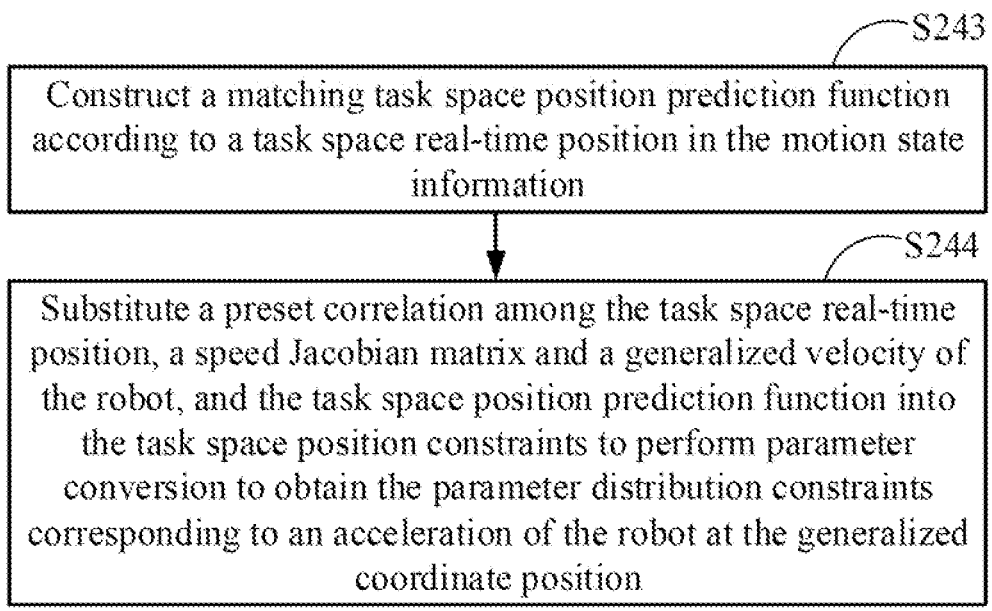
FIG. 5 is an exemplary flowchart of a method for constructing matching parameter distribution constraints according to another embodiment.

FIG. 5 is the other schematic flowchart of the sub-steps included in step S240 in FIG. 2. In one embodiment, if the body action safety constraints include task space position constraints for the robot task space, the step S240 may include steps S243 and S244, which are used to realize effective constraints on the motion range of the robot task space from the dimension of generalized acceleration, so as to ensure that the final determined robot action is still within the safe range of maintaining robot operation, and avoid robot motion accidents.

Step S243: Construct a matching task space position prediction function according to a task space real-time position in the motion state information.

In one embodiment, the task space position prediction function can be expressed by the second-order Taylor expansion of the task space position with respect to the current moment. In this case, the task space position prediction function can be expressed by the following equation:

$$\gamma(t) \cong \gamma(\bar{t}) + \dot{\gamma}(\bar{t})\Delta t + \frac{1}{2}\ddot{\gamma}(\bar{t})\Delta t^2, t = \bar{t} + \Delta t,$$

where $\gamma(t)$ represents the predicted task space position at moment t, $\gamma(\bar{t})$ represents the task space real-time position at a current moment $\bar{t}$, $\Delta t$ represents a preset time interval, $\dot{\gamma}(\bar{t})$ is a first derivative of $\gamma(t)$ and represents the task space movement speed of the robot at the real-time position of the task space at the current moment $\bar{t}$, and $\ddot{\gamma}(\bar{t})$ is a second derivative of $\gamma(t)$ and represents the task space movement acceleration of the robot at the real-time position of the task space at the current moment $\bar{t}$.

Step S244: Substitute a preset correlation among the task space real-time position, a speed Jacobian matrix and a generalized velocity of the robot, and the task space position prediction function into the task space position constraints to perform parameter conversion to obtain the parameter distribution constraints corresponding to an acceleration of the robot at the generalized coordinate position.

In one embodiment, the preset correlation among the task space real-time position, the speed Jacobian matrix and the generalized velocity of the robot can be expressed as follows: $\dot{\gamma}=J\dot{q}$, where $\dot{\gamma}$ represents the task space real-time position, J represents the speed Jacobian matrix, and $\dot{q}$ represents the generalized velocity of the robot. The task space position constraints can be expressed by [$r_{min}$, $r_{max}$], where $r_{min}$ represents the position lower limit in the task space position constraints, and $r_{max}$ represents the position upper limit in the task space position constraints.

The parameter distribution constraints corresponding to the acceleration of the robot at the generalized coordinate position can be expressed as follows:

$$\begin{cases} C_r = \frac{1}{2}\Delta t^2 J \\ lb_r = r_{min} - \gamma(\bar{t}) - \Delta t\left(J + \frac{\Delta t}{2}\dot{J}\right)\dot{q}(\bar{t}) \\ ub_r = r_{max} - \gamma(\bar{t}) - \Delta t\left(J + \frac{\Delta t}{2}\dot{J}\right)\dot{q}(\bar{t}) \end{cases},$$

where $\ddot{q}$ represents an acceleration of the robot at the generalized coordinate position, J represents the speed Jacobian matrix in the desired motion trajectory information, $\dot{q}(\bar{t})$ represent the generalized velocity of the robot at the current moment $\bar{t}$, $\dot{J}$ is the first derivative of J, $r_{min}$ represents a position lower limit in the task space position constraints, and $r_{max}$ represents a position upper limit in the task space position constraints.

By executing the steps S243 and S244, it can realize effective constraints on the motion range of the robot task space from the dimension of generalized acceleration, so as to ensure that the final determined robot action is still within the safe range of maintaining robot operation, thereby avoiding robot motion accidents.

Step S250: Solve a pre-stored task execution loss function by using the task execution coefficient matrices to obtain the target-driven parameters satisfying the dynamic constraints and the parameter distribution constraints.

In one embodiment, the task execution loss function is expressed as follows: $\min_X \|AX-b\|_w^2, X=[\ddot{q}, f_{ext}]^T$, where A represents a first task coefficient matrix of the target task, h represents a second task coefficient matrix of the target task, $\ddot{q}$ represents an acceleration of the robot at the generalized coordinate position, $f_{ext}$ represents the external force on the robot, $\|\ \|^2$ represents an L2 norm of vector, w represents an execution weight matrix of the target task. The execution weight matrix is formed by the aggregation of the execution weights of the to-be-performed tasks of the target task.

In the process of solving the above-mentioned task execution loss function, the processor of the robot substitutes the obtained task execution coefficient matrices corresponding to the target task, dynamic constraints and parameter distribution constraints into the task execution loss function and calculates the target-driven parameters that satisfy the dynamic constraints and parameter distribution constraints by solving the QP (Quadratic Programming) problem for the task execution loss function. The motion state of the robot can then be controlled based on the target-driven parameters, so that the robot can perform the target task correspondingly, and realize the desired motion effect and ensure that the robot's motion conforms to the robot's motion law. The robot's joints are thus within the effective position range, which can avoid joint singularity, and improve the safety of the robot's operation.

Figure 6:
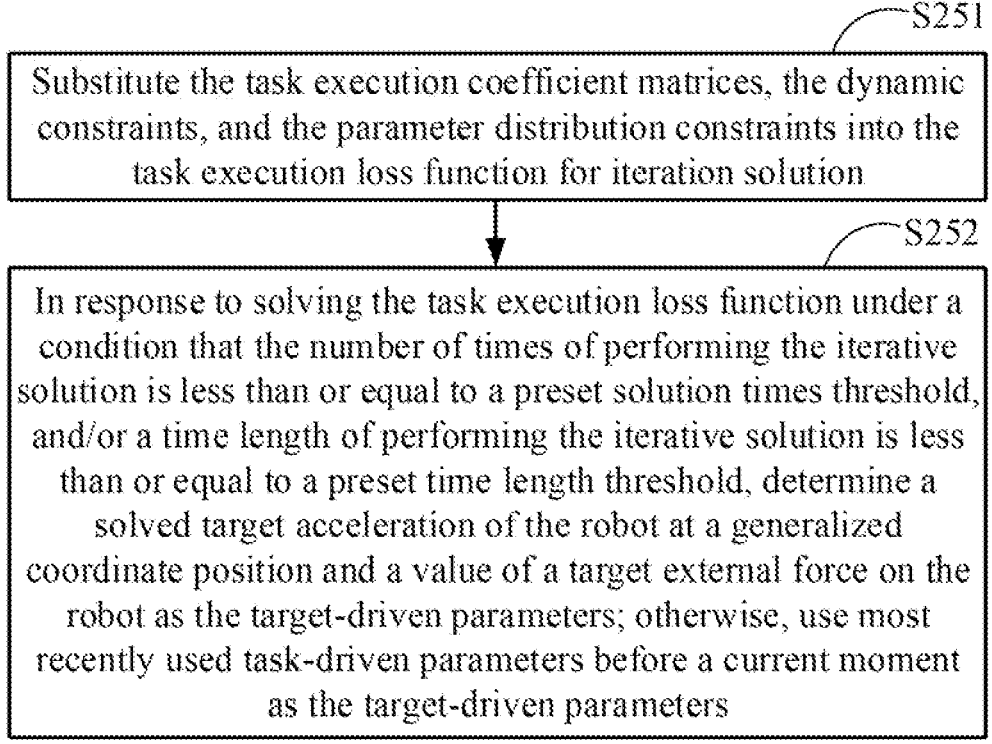
FIG. 6 is an exemplary flowchart of a method for solving a pre-stored task execution loss function according to another embodiment.

FIG. 6 is a schematic flowchart of sub-steps included in step S250 in FIG. 2. In one embodiment, the step S250 may include a steps S251 and S252.

Step S251: Substitute the task execution coefficient matrices, the dynamic constraints, and the parameter distribution constraints into the task execution loss function for iteration solution.

In this embodiment, the task execution loss function can be used as the subject of a QP problem, the dynamic constraints can be used as an equality constraint of the QP problem, the parameter distribution constraints can be used as an inequality constraint of the QP problem. Then, the task execution coefficient matrices are substituted into the task execution loss function, and then the QP problem can be iteratively solved to determine the task-driven parameters represented by the QP problem and satisfying the robot motion law (robot dynamic characteristics) and the safe motion range of body action.

Step S252: In response to solving the task execution loss function under a condition that the number of times of performing the iterative solution is less than or equal to a preset solution times threshold, and/or a time length of performing the iterative solution is less than or equal to a preset time length threshold, determine a solved target acceleration of the robot at a generalized coordinate position and a value of a target external force on the robot as the target-driven parameters; otherwise, use most recently used task-driven parameters before a current moment as the target-driven parameters.

If the QP problem can be solved under the condition that the number of times of performing the iterative solution is less than or equal to the preset solution times threshold, and/or the time length of performing the iterative solution is less than or equal to the preset solution time threshold, it means that the solved task-driven parameters are valid parameters. In this case, the solved target acceleration of the robot at the generalized coordinate position and the value of the target external force on the robot can be used as the target-driven parameters.

If the QP problem is solved under the condition that the number of times of performing the iterative solution is greater than the preset solution times threshold, and/or the time length of performing the iterative solution is greater than the preset time length threshold, it cannot guarantee that the solved task-driven parameters are useful, and that the corresponding robot action satisfies the robot motion law, and effectively constrains the safe range of motion corresponding to the robot body action. In this case, the most recently used task driving parameters before the current moment can be maintained unchanged, so as to ensure that the robot remains in a safe operating state.

By executing the steps S251 and S252, it can ensure that the solved task-driven parameters can match the real-time state of the robot, the robot can achieve the desired motion effect based on the task-driven parameters, the robot's motion conforms to the robot's motion law, and effectively restrict the safe motion range of the motion of the body of the robot, thereby improving the safety of the robot's operation.

Step S260: Control operation state of each joint end effector of the robot according to the target-driven parameters, so as to drive the robot to perform the target task.

In one embodiment, after the processor of the robot determines the target-driven parameters corresponding to the target tasks, it will calculate a target generalized force relative to the target-driven parameters according to the parameter correlation between the acceleration of the robot at the generalized coordinate position, the generalized force and the external force on the robot. Then, the processor will adjust the operation state of the corresponding joint end effectors according to the joint moment component of the target generalized force at each joint end effector, so as to ensure that the robot can correspondingly perform the target task.

When the joint torque component corresponding to a certain joint end effector is determined, the state control will be carried out by using a matching joint control algorithm according to the type of the joint end effector. For example, if the type of a joint end effector is a position control joint, the corresponding joint position can be calculated based on the corresponding joint moment component, and the calculated joint position can be used as the servo angle of the joint end effector. If the type of a joint end actuator is a force control joint, the joint moment component can be used as the tracking torque of the joint end actuator. If the type of a joint end actuator is a force-position hybrid control joint, the corresponding joint position and joint movement speed can be calculated based on the corresponding joint torque component. Then, the joint torque component, joint position and joint movement speed are comprehensively used to control the operation state of the joint end actuator.

By executing the steps S210 to S260 above, the real-time state of the robot is combined into the control process of the robot's motion state to ensure that the robot achieves the desired motion effect and the robot's action conforms to the robot's motion law, which effectively restricts the safe range of motion of the robot's body, avoids joint singularities or structural singularities, and improves the safety of the robot's operation.

In order to ensure that the robot can perform the above-mentioned method through the task execution control device, the present disclosure implements the aforementioned functions by dividing the task execution control device into multiple functional modules. FIG. 7 is a schematic block diagram of a task execution control device 100 according to one embodiment. The task execution control device 100 may include a motion information acquisition module 10, a task coefficient determination module 20, a motion constraints module 30, a body motion limitation module 40, a drive parameter solution module 50, and a control module 60.

The motion information acquisition module 110 is to obtain current motion state information of the robot and desired motion trajectory information corresponding to a target task. The task coefficient determination module 20 is to determine task execution coefficient matrices corresponding to the robot performing the target task according to the desired motion trajectory information and the motion state information. The motion constraints module 30 to construct matching dynamic constraints for task-driven parameters of the robot according to the desired motion trajectory information and the motion state information. The body motion limitation module 40 is to construct matching parameter distribution constraints for the task-driven parameters according to the motion state information and body action safety constraints corresponding to the target task. The drive parameter solution module 50 is to solve a pre-stored task execution loss function by using the task execution coefficient matrices to obtain the target-driven parameters satisfying the dynamic constraints and the parameter distribution constraints. The control module 60 is to control operation state of each joint end effector of the robot according to the target-driven parameters, so as to drive the robot to perform the target task.

In one embodiment, the target task may include at least one to-be-performed task, and the task execution coefficient matrices may include a first task coefficient matrix and a second task coefficient matrix. The task coefficient determination module 20 is to: for each to-be-performed task of the at least one to-be-performed task, obtain an end Jacobian matrix corresponding to the to-be-performed task from the desired trajectory information, and constructing a first execution coefficient sub-matrix of the to-be-performed task based on the end Jacobian matrix; obtain a generalized velocity of the robot from the motion state information, obtain a desired end acceleration corresponding to the at least one to-be-performed task from the desired motion trajectory information, and construct a second execution coefficient sub-matrix of the at least one to-be-performed task according to the generalized velocity, the end Jacobian matrix and the desired end acceleration; for each to-be-performed task of the at least one to-be-performed task, perform weighted calculation on the first execution coefficient sub-matrix and the second execution coefficient sub-matrix of the to-be-performed task with a performing weight of the to-be-performed task to obtain a first weighted parameter sub-matrix and a second weighted parameter sub-matrix of the to-be-performed task; and performing matrix aggregation on the first weighted parameter sub-matrices of all of the at least one to-be-performed task to obtain the first task coefficient matrix of the target task, and perform matrix aggregation on the second weighted parameter sub-matrices of all of the at least one to-be-performed task to obtain the second task coefficient matrix of the target task.

In one embodiment, the target-driven parameters may include an acceleration of the robot at a generalized coordinate position and an external force on the robot, and the dynamic constraints are expressed as follows: $M(q)\ddot{q}+B(q,\dot{q})+G(q)=\tau+J_{ext}(q)^T f_{ext}$, where $q$ represents the generalized coordinate position of the robot in the motion state information, $\dot{q}$ represents a generalized velocity of the robot in the motion state information, $M(\ )$ represents a robot inertia matrix in the desired motion trajectory information, $B(\ )$ represents a nonlinear matrix produced by centrifugal force and Coriolis force in the desired motion trajectory information, $G(\ )$ represents a gravity matrix of the robot in the desired motion trajectory information, $J_{ext}$ represents a Jacobian matrix at a point of application of external force in the desired motion trajectory information, $\tau$ represents a generalized force acting on the generalized coordinate position of the robot, $\ddot{q}$ represents the acceleration of the robot at the generalized coordinate position, and $f_{ext}$ represents the external force on the robot.

In one embodiment, the body action safety constraints may include effective joint position constraints for joints of the robot. The body motion limitation module 40 is further to: construct a matching joint position prediction function according to real-time positions of the joints in the motion state information; and substitute the joint position prediction function into the effective joint position constraints for parameter conversion to obtain the parameter distribution constraints corresponding to an acceleration of the robot at a generalized coordinate position.

In one embodiment, the joint position prediction function is expressed as follows:

$$q(t) \cong q(\bar{t}) + \dot{q}(\bar{t})\Delta t + \frac{1}{2}\ddot{q}(\bar{t})\Delta t^2, t = \bar{t} + \Delta t,$$

where $q(t)$ represents a predicted joint position at moment $\bar{t}$, $q(\bar{t})$ represents a real-time joint position at a current moment $\bar{t}$, $\Delta t$ represents a preset time interval, $\dot{q}(\bar{t})$ is a first derivative of $q(t)$ and represents a joint velocity at the current moment $\bar{t}$, $\ddot{q}(\bar{t})$ is a second derivative of $q(t)$ and represents a joint acceleration the current moment $\bar{t}$.

In one embodiment, the parameter distribution constraints corresponding to the acceleration of the robot at the generalized coordinate position are expressed as follows:

$$lb_\theta \leq C_\theta \ddot{q} \leq ub_\theta;$$

$$\begin{cases} C_\theta = \frac{1}{2}\Delta t^2 \\ lb_\theta = \theta_{min} - q - \Delta t \dot{q} \\ ub_\theta = \theta_{max} - q - \Delta t \dot{q} \end{cases},$$

where $\ddot{q}$ represents an acceleration of the robot at the generalized coordinate position, $\dot{q}$ represents a generalized velocity of the robot in the motion state information, $q$ represents a generalized coordinate position of the robot in the motion state information, $\theta_{min}$ represents a joint position lower limit in the effective joint position constraints, and $\theta_{max}$ represents a joint position upper limit in the effective joint position constraints.

In one embodiment, the body action safety constraints may include task space position constraints for a robot task space. The body motion limitation module 40 is further to: construct a matching task space position prediction function according to a task space real-time position in the motion state information; and substitute a preset correlation among the task space real-time position, a speed Jacobian matrix and a generalized velocity of the robot, and the task space position prediction function into the task space position constraints to perform parameter conversion to obtain the parameter distribution constraints corresponding to an acceleration of the robot at the generalized coordinate position.

In one embodiment, the task space position prediction function is expressed as follows:

$$\gamma(t) \cong \gamma(\bar{t}) + \dot{\gamma}(\bar{t})\Delta t + \frac{1}{2}\ddot{\gamma}(\bar{t})\Delta t^2, t = \bar{t} + \Delta t,$$

where $\gamma(t)$ represents the predicted task space position at moment $t$, $\gamma(\bar{t})$ represents the task space real-time position at a current moment $\bar{t}$, $\Delta t$ represents a preset time interval, $\dot{\gamma}(\bar{t})$ is a first derivative of $\gamma(t)$, and $\ddot{\gamma}(\bar{t})$ is a second derivative of $\gamma(t)$.

The parameter distribution constraints corresponding to the acceleration of the robot at the generalized coordinate position are expressed as follows:

$$lb_r \leq C_r \ddot{q} \leq ub_r;$$

$$\begin{cases} C_r = \frac{1}{2}\Delta t^2 J \\ lb_r = r_{min} - \gamma(\bar{t}) - \Delta t\left(J + \frac{\Delta t}{2}\dot{J}\right)\dot{q}(\bar{t}) \\ ub_r = r_{max} - \gamma(\bar{t}) - \Delta t\left(J + \frac{\Delta t}{2}\dot{J}\right)\dot{q}(\bar{t}) \end{cases}$$

where $\ddot{q}$ represents an acceleration of the robot at the generalized coordinate position, $J$ represents the speed Jacobian matrix in the desired motion trajectory information, $\dot{q}(\bar{t})$ represent the generalized velocity of the robot at the current moment $\bar{t}$, $\dot{J}$ is the first derivative of $J$, $r_{min}$ represents a position lower limit in the task space position constraints, and $r_{max}$ represents a position upper limit in the task space position constraints In one embodiment, the drive parameter solution module 50 is further to: substitute the task execution coefficient matrices, the dynamic constraints, and the parameter distribution constraints into the task execution loss function for iteration solution; and in response to solving the task execution loss function under a condition that a number of times of performing the iterative solution is less than or equal to a preset solution times threshold, and/or a time length of performing the iterative solution is less than or equal to a preset time length threshold, determine a solved target acceleration of the robot at a generalized coordinate position and a value of a target external force on the robot as the target-driven parameters; and in response to solving the task execution loss function under a condition that the number of times of performing the iterative solution is greater than the preset solution times threshold, and/or the time length of performing the iterative solution is greater than the preset time length threshold, use most recently used task-driven parameters before a current moment as the target-driven parameters.

In one embodiment, the task execution loss function is expressed as follows: $\min_X \|AX-b\|_w^2$, $X=[\ddot{q}, f_{ext}]^T$, where A represents a first task coefficient matrix of the target task, b represents a second task coefficient matrix of the target task, $\ddot{q}$ represents an acceleration of the robot at the generalized coordinate position, $f_{ext}$ represents the external force on the robot, $\| \|^2$ represents an L2 norm of vector, w represents an execution weight matrix of the target task.

It can be understood that the device in the embodiments above corresponds to the method in the embodiments above. The basic principles and technical effects of the device are the same as the aforementioned method. For a brief description, for parts not mentioned in this device embodiment, reference can be made to corresponding description in the method embodiments.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for controlling a robot, the method comprising:
   providing the robot comprising: a processor, one or more joint end effectors, and a communication unit, wherein the one or more joint end effectors and the communication unit are electrically coupled to the processor, and the communication unit is to establish a communication connection between the robot and a trajectory planning device through a network, and wherein a state estimator is installed on the robot;
   obtaining, by the processor, current motion state information of the robot fed back by the state estimator, and obtaining, by the communication unit, desired motion trajectory information corresponding to a target task from the trajectory planning device through the network, wherein the target task comprises at least one to-be-performed task of the robot;
   determining, by the processor, task execution coefficient matrices corresponding to the robot performing the target task according to the desired motion trajectory information and the current motion state information;
   constructing, by the processor, matching dynamic constraints for task-driven parameters of the robot according to the desired motion trajectory information and the current motion state information;

constructing, by the processor, matching parameter distribution constraints for the task-driven parameters according to the current motion state information and body action safety constraints corresponding to the target task;

solving, by the processor, a pre-stored task execution loss function by using the task execution coefficient matrices to obtain target-driven parameters satisfying the dynamic constraints and the parameter distribution constraints; and driving, by the processor, the robot to perform the target task through controlling operation state of each joint end effector of the robot according to the target-driven parameters.

2. The method of claim 1, wherein the task execution coefficient matrices comprise a first task coefficient matrix and a second task coefficient matrix; determining the task execution coefficient matrices corresponding to the robot performing the target task according to the desired motion trajectory information and the current motion state information comprises:

for each to-be-performed task of the at least one to-be-performed task, obtaining an end Jacobian matrix corresponding to the to-be-performed task from the desired trajectory information, and constructing a first execution coefficient sub-matrix of the to-be-performed task based on the end Jacobian matrix;

obtaining a generalized velocity of the robot from the current motion state information, obtaining a desired end acceleration corresponding to the at least one to-be-performed task from the desired motion trajectory information, and constructing a second execution coefficient sub-matrix of the at least one to-be-performed task according to the generalized velocity, the end Jacobian matrix and the desired end acceleration;

for each to-be-performed task of the at least one to-be-performed task, performing weighted calculation on the first execution coefficient sub-matrix and the second execution coefficient sub-matrix of the to-be-performed task with a performing weight of the to-be-performed task to obtain a first weighted parameter sub-matrix and a second weighted parameter sub-matrix of the to-be-performed task; and performing matrix aggregation on the first weighted parameter sub-matrices of all of the at least one to-be-performed task to obtain the first task coefficient matrix of the target task, and performing matrix aggregation on the second weighted parameter sub-matrices of all of the at least one to-be-performed task to obtain the first task coefficient matrix of the target task.

3. The method of claim 1, wherein the target-driven parameters comprise an acceleration of the robot at a generalized coordinate position and an external force on the robot, the dynamic constraints are expressed as follows: $M(q)\ddot{q}+B(q,\dot{q})+G(q)=\tau+J_{ext}(q)^T f_{ext}$, where q represents the generalized coordinate position of the robot in the current motion state information, $\dot{q}$ represents a generalized velocity of the robot in the current motion state information, $M(\ )$ represents a robot inertia matrix in the desired motion trajectory information, $B(\ )$ represents a nonlinear matrix produced by centrifugal force and Coriolis force in the desired motion trajectory information, $G(\ )$ represents a gravity matrix of the robot in the desired motion trajectory information, $J_{ext}$ represents a Jacobian matrix at a point of application of external force in the desired motion trajectory information, τ represents a generalized force acting on the generalized coordinate position of the robot, $\ddot{q}$ represents the acceleration of the robot at the generalized coordinate position, and $f_{ext}$ represents the external force on the robot.

4. The method of claim 1, wherein the body action safety constraints comprise effective joint position constraints for joints of the robot, constructing the matching parameter distribution constraints for the task-driven parameters according to the current motion state information and body action safety constraints corresponding to the target task comprises:

constructing a matching joint position prediction function according to real-time positions of the joints in the current motion state information; and substituting the joint position prediction function into the effective joint position constraints for parameter conversion to obtain the parameter distribution constraints corresponding to an acceleration of the robot at a generalized coordinate position.

5. The method of claim 4, wherein the joint position prediction function is expressed as follows:

$$q(t) \cong q(\bar{t}) + \dot{q}(\bar{t})\Delta t + \frac{1}{2}\ddot{q}(\bar{t})\Delta t^2, t = \bar{t} + \Delta t,$$

where q(t) represents a predicted joint position at moment $\bar{t}$, $q(\bar{t})$ represents a real-time joint position at a current moment $\bar{t}$, Δt represents a preset time interval, $\dot{q}(\bar{t})$ is a first derivative of q(t) and represents a joint velocity at the current moment $\bar{t}$, $\ddot{q}(\bar{t})$ is a second derivative of q(t) and represents a joint acceleration the current moment $\bar{t}$;

the parameter distribution constraints corresponding to the acceleration of the robot at the generalized coordinate position are expressed as follows:

$lb_\theta \leq C_\theta \ddot{q} \leq ub_\theta$;

$$\begin{cases} C_\theta = \frac{1}{2}\Delta t^2 \\ lb_\theta = \theta_{min} - q - \Delta t \dot{q} \\ ub_\theta = \theta_{max} - q - \Delta t \dot{q} \end{cases},$$

where $\ddot{q}$ represents an acceleration of the robot at the generalized coordinate position, $\dot{q}$ represents a generalized velocity of the robot in the current motion state information, q represents a generalized coordinate position of the robot in the current motion state information, $\theta_{min}$ represents a joint position lower limit in the effective joint position constraints, and $\theta_{max}$ represents a joint position upper limit in the effective joint position constraints.

6. The method of claim 1, wherein the body action safety constraints comprise task space position constraints for a robot task space, constructing the matching parameter distribution constraints for the task-driven parameters according to the current motion state information and body action safety constraints corresponding to the target task comprise:

constructing a matching task space position prediction function according to a task space real-time position in the current motion state information; and substituting a preset correlation among the task space real-time position, a speed Jacobian matrix and a generalized velocity of the robot, and the task space position prediction function into the task space position constraints to perform parameter conversion to obtain the parameter distribution constraints corresponding to an acceleration of the robot at the generalized coordinate position.

7. The method of claim 6, wherein the task space position prediction function is expressed as follows:

$$\gamma(t) \cong \gamma(\bar{t}) + \dot{\gamma}(\bar{t})\Delta t + \frac{1}{2}\ddot{\gamma}(\bar{t})\Delta t^2, t = \bar{t} + \Delta t,$$

where $\gamma(t)$ represents the predicted task space position at moment t, $\gamma(\bar{t})$ represents the task space real-time position at a current moment $\bar{t}$, $\Delta t$ represents a preset time interval, $\dot{\gamma}(\bar{t})$ is a first derivative of $\gamma(t)$, and $\ddot{\gamma}(\bar{t})$ is a second derivative of $\gamma(t)$;

the parameter distribution constraints corresponding to the acceleration of the robot at the generalized coordinate position are expressed as follows:

$lb_r \leq C_r \ddot{q} \leq ub_r$;

$$\begin{cases} C_r = \frac{1}{2}\Delta t^2 J \\ lb_r = r_{min} - \gamma(\bar{t}) - \Delta t\left(J + \frac{\Delta t}{2}\dot{J}\right)\dot{q}(\bar{t}) \\ ub_r = r_{max} - \gamma(\bar{t}) - \Delta t\left(J + \frac{\Delta t}{2}\dot{J}\right)\dot{q}(\bar{t}) \end{cases}$$

where $\ddot{q}$ represents an acceleration of the robot at the generalized coordinate position, J represents the speed Jacobian matrix in the desired motion trajectory information, $\dot{q}(t)$ represent the generalized velocity of the robot at the current moment $\bar{t}$, $\dot{J}$ is the first derivative of J, $r_{min}$ represents a position lower limit in the task space position constraints, and $r_{max}$ represents a position upper limit in the task space position constraints.

8. The method of claim 1, wherein solving the pre-stored task execution loss function by using the task execution coefficient matrices to obtain the target-driven parameters satisfying the dynamic constraints and the parameter distribution constraints comprises:
substituting the task execution coefficient matrices, the dynamic constraints, and the parameter distribution constraints into the task execution loss function for iteration solution; and
in response to solving the task execution loss function under a condition that a number of times of performing the iterative solution is less than or equal to a preset solution times threshold, and/or a time length of performing the iterative solution is less than or equal to a preset time length threshold, determining a solved target acceleration of the robot at a generalized coordinate position and a value of a target external force on the robot as the target-driven parameters; and
in response to solving the task execution loss function under a condition that the number of times of performing the iterative solution is greater than the preset solution times threshold, and/or the time length of performing the iterative solution is greater than the preset time length threshold, using most recently used task-driven parameters before a current moment as the target-driven parameters.

9. The method of claim 8, wherein the task execution loss function is expressed as follows: $\min_X \|AX-b\|_w^2$, $X=[\ddot{q}, f_{ext}]^T$, where A represents a first task coefficient matrix of the target task, b represents a second task coefficient matrix of the target task, $\ddot{q}$ represents an acceleration of the robot at the generalized coordinate position, $f_{ext}$ represents the external force on the robot, $\| \|^2$ represents an L2 norm of vector, w represents an execution weight matrix of the target task.

10. A robot comprising:
one or more processors;
one or more joint end effectors electrically coupled to the one or more processors;
a communication unit electrically coupled to the one or more processors, wherein the communication unit is to establish a communication connection between the robot and a trajectory planning device through a network; and
a memory coupled to the one or more processors, the memory storing programs that, when executed by the one or more processors, cause performance of operations comprising:
obtaining current motion state information of the robot fed back by a state estimator installed on the robot, and obtaining desired motion trajectory information corresponding to a target task by the communication unit from the trajectory planning device, wherein the target task comprises at least one to-be-performed task of the robot;
determining task execution coefficient matrices corresponding to the robot performing the target task according to the desired motion trajectory information and the current motion state information;
constructing matching dynamic constraints for task-driven parameters of the robot according to the desired motion trajectory information and the current motion state information;
constructing matching parameter distribution constraints for the task-driven parameters according to the current motion state information and body action safety constraints corresponding to the target task;
solving a pre-stored task execution loss function by using the task execution coefficient matrices to obtain target-driven parameters satisfying the dynamic constraints and the parameter distribution constraints; and
driving the robot to perform the target task by controlling operation state of each joint end effector of the robot according to the target-driven parameters.

11. The robot of claim 10, wherein the task execution coefficient matrices comprise a first task coefficient matrix and a second task coefficient matrix; determining the task execution coefficient matrices corresponding to the robot performing the target task according to the desired motion trajectory information and the current motion state information comprises:
for each to-be-performed task of the at least one to-be-performed task, obtaining an end Jacobian matrix corresponding to the to-be-performed task from the desired trajectory information, and constructing a first execution coefficient sub-matrix of the to-be-performed task based on the end Jacobian matrix;
obtaining a generalized velocity of the robot from the current motion state information, obtaining a desired end acceleration corresponding to the at least one to-be-performed task from the desired motion trajectory information, and constructing a second execution coefficient sub-matrix of the at least one to-be-performed task according to the generalized velocity, the end Jacobian matrix and the desired end acceleration;
for each to-be-performed task of the at least one to-be-performed task, performing weighted calculation on the first execution coefficient sub-matrix and the second execution coefficient sub-matrix of the to-be-performed task with a performing weight of the to-be-performed task to obtain a first weighted parameter sub-matrix and a second weighted parameter sub-matrix of the to-be-performed task; and performing matrix aggregation on the first weighted parameter sub-matrices of all of the at least one to-be-performed task to obtain the first task coefficient matrix of the target task, and performing matrix aggregation on the second weighted parameter sub-matrices of all of the at least one to-be-performed task to obtain the first task coefficient matrix of the target task.

12. The robot of claim 10, wherein the target-driven parameters comprise an acceleration of the robot at a generalized coordinate position and an external force on the robot, the dynamic constraints are expressed as follows: $M(q)\ddot{q}+B(q,\dot{q})+G(q)=\tau+J_{ext}(q)^T f_{ext}$, where q represents the generalized coordinate position of the robot in the current motion state information, $\dot{q}$ represents a generalized velocity of the robot in the current motion state information, M( ) represents a robot inertia matrix in the desired motion trajectory information, B( ) represents a nonlinear matrix produced by centrifugal force and Coriolis force in the desired motion trajectory information, G( ) represents a gravity matrix of the robot in the desired motion trajectory information, $J_{ext}$ represents a Jacobian matrix at a point of application of external force in the desired motion trajectory information, T represents a generalized force acting on the generalized coordinate position of the robot, $\ddot{q}$ represents the acceleration of the robot at the generalized coordinate position, and $f_{ext}$ represents the external force on the robot.

13. The robot of claim 10, wherein the body action safety constraints comprise effective joint position constraints for joints of the robot, constructing the matching parameter distribution constraints for the task-driven parameters according to the current motion state information and body action safety constraints corresponding to the target task comprises:

constructing a matching joint position prediction function according to real-time positions of the joints in the current motion state information; and substituting the joint position prediction function into the effective joint position constraints for parameter conversion to obtain the parameter distribution constraints corresponding to an acceleration of the robot at a generalized coordinate position.

14. The robot of claim 13, wherein the joint position prediction function is expressed as follows:

$$q(t) \cong q(\bar{t}) + \dot{q}(\bar{t})\Delta t + \frac{1}{2}\ddot{q}(\bar{t})\Delta t^2, t = \bar{t} + \Delta t,$$

where q(t) represents a predicted joint position at moment $\bar{t}$, $q(\bar{t})$ represents a real-time joint position at a current moment $\bar{t}$, $\Delta t$ represents a preset time interval, $\dot{q}(\bar{t})$ is a first derivative of q(t) and represents a joint velocity at the current moment $\bar{t}$, $\ddot{q}(\bar{t})$ is a second derivative of q(t) and represents a joint acceleration the current moment $\bar{t}$;

the parameter distribution constraints corresponding to the acceleration of the robot at the generalized coordinate position are expressed as follows:

$lb_\theta \leq C_\theta \ddot{q} \leq ub_\theta;$ $$\begin{cases} C_\theta = \frac{1}{2}\Delta t^2 \\ lb_\theta = \theta_{min} - q - \Delta t \dot{q} \\ ub_\theta = \theta_{max} - q - \Delta t \dot{q} \end{cases},$$

where $\ddot{q}$ represents an acceleration of the robot at the generalized coordinate position, $\dot{q}$ represents a generalized velocity of the robot in the current motion state information, q represents a generalized coordinate position of the robot in the current motion state information, $\theta_{min}$ represents a joint position lower limit in the effective joint position constraints, and $\theta_{max}$ represents a joint position upper limit in the effective joint position constraints.

15. The robot of claim 10, wherein the body action safety constraints comprise task space position constraints for a robot task space, constructing the matching parameter distribution constraints for the task-driven parameters according to the current motion state information and body action safety constraints corresponding to the target task comprise:

constructing a matching task space position prediction function according to a task space real-time position in the current motion state information; and substituting a preset correlation among the task space real-time position, a speed Jacobian matrix and a generalized velocity of the robot, and the task space position prediction function into the task space position constraints to perform parameter conversion to obtain the parameter distribution constraints corresponding to an acceleration of the robot at the generalized coordinate position.

16. The robot of claim 15, wherein the task space position prediction function is expressed as follows:

$$\gamma(t) \cong \gamma(\bar{t}) + \dot{\gamma}(\bar{t})\Delta t + \frac{1}{2}\ddot{\gamma}(\bar{t})\Delta t^2, t = \bar{t} + \Delta t,$$

where γ(t) represents the predicted task space position at moment t, γ($\bar{t}$) represents the task space real-time position at a current moment $\bar{t}$, $\Delta t$ represents a preset time interval, $\dot{\gamma}(\bar{t})$ is a first derivative of γ(t), and $\ddot{\gamma}(\bar{t})$ is a second derivative of γ(t);

the parameter distribution constraints corresponding to the acceleration of the robot at the generalized coordinate position are expressed as follows:

$lb_r \leq C_r \ddot{q} \leq ub_r;$ $$\begin{cases} C_r = \frac{1}{2}\Delta t^2 J \\ lb_r = r_{min} - \gamma(\bar{t}) - \Delta t\left(J + \frac{\Delta t}{2}\dot{J}\right)\dot{q}(\bar{t}) \\ ub_r = r_{max} - \gamma(\bar{t}) - \Delta t\left(J + \frac{\Delta t}{2}\dot{J}\right)\dot{q}(\bar{t}) \end{cases},$$

where $\ddot{q}$ represents an acceleration of the robot at the generalized coordinate position, J represents the speed Jacobian matrix in the desired motion trajectory information, $\dot{q}(t)$ represent the generalized velocity of the robot at the current moment $\bar{t}$, $\dot{J}$ is the first derivative of J, $r_{min}$ represents a position lower limit in the task space position constraints, and $r_{max}$ represents a position upper limit in the task space position constraints.

17. The robot of claim 10, wherein solving the pre-stored task execution loss function by using the task execution coefficient matrices to obtain the target-driven parameters satisfying the dynamic constraints and the parameter distribution constraints comprises:
substituting the task execution coefficient matrices, the dynamic constraints, and the parameter distribution constraints into the task execution loss function for iteration solution; and
in response to solving the task execution loss function under a condition that a number of times of performing the iterative solution is less than or equal to a preset solution times threshold, and/or a time length of performing the iterative solution is less than or equal to a preset time length threshold, determining a solved target acceleration of the robot at a generalized coordinate position and a value of a target external force on the robot as the target-driven parameters; and
in response to solving the task execution loss function under a condition that the number of times of performing the iterative solution is greater than the preset solution times threshold, and/or the time length of performing the iterative solution is greater than the preset time length threshold, using most recently used task-driven parameters before a current moment as the target-driven parameters.

18. The robot of claim 17, wherein the task execution loss function is expressed as follows: $\min_X \|AX-b\|_w^2$, $X=[\ddot{q}, f_{ext}]^T$, where A represents a first task coefficient matrix of the target task, b represents a second task coefficient matrix of the target task, $\ddot{q}$ represents an acceleration of the robot at the generalized coordinate position, $f_{ext}$ represents the external force on the robot, $\| \|^2$ represents an L2 norm of vector, w represents an execution weight matrix of the target task.

19. A non-transitory computer-readable storage medium storing instructions that, when executed by at least one processor of a robot, cause the at least one processor to perform a method, wherein the robot further comprises: one or more joint end effectors and a communication unit, the one or more joint end effectors and the communication unit are electrically coupled to the at least one processor, the communication unit is to establish a communication connection between the robot and a trajectory planning device through a network, a state estimator is installed on the robot, and the method comprises:
obtaining current motion state information of the robot fed back by the state estimator, and obtaining desired motion trajectory information corresponding to a target task by the communication unit from the trajectory planning device, wherein the target task comprises at least one to-be-performed task of the robot;
determining task execution coefficient matrices corresponding to the robot performing the target task according to the desired motion trajectory information and the current motion state information;
constructing matching dynamic constraints for task-driven parameters of the robot according to the desired motion trajectory information and the current motion state information;
constructing matching parameter distribution constraints for the task-driven parameters according to the current motion state information and body action safety constraints corresponding to the target task;
solving a pre-stored task execution loss function by using the task execution coefficient matrices to obtain the target-driven parameters satisfying the dynamic constraints and the parameter distribution constraints; and
driving the robot to perform the target task by controlling operation state of each joint end effector of the robot according to the target-driven parameters.

20. The non-transitory computer-readable storage medium of claim 19, wherein the task execution coefficient matrices comprise a first task coefficient matrix and a second task coefficient matrix; determining the task execution coefficient matrices corresponding to the robot performing the target task according to the desired motion trajectory information and the current motion state information comprises:
for each to-be-performed task of the at least one to-be-performed task, obtaining an end Jacobian matrix corresponding to the to-be-performed task from the desired trajectory information, and constructing a first execution coefficient sub-matrix of the to-be-performed task based on the end Jacobian matrix;
obtaining a generalized velocity of the robot from the current motion state information, obtaining a desired end acceleration corresponding to the at least one to-be-performed task from the desired motion trajectory information, and constructing a second execution coefficient sub-matrix of the at least one to-be-performed task according to the generalized velocity, the end Jacobian matrix and the desired end acceleration;
for each to-be-performed task of the at least one to-be-performed task, performing weighted calculation on the first execution coefficient sub-matrix and the second execution coefficient sub-matrix of the to-be-performed task with a performing weight of the to-be-performed task to obtain a first weighted parameter sub-matrix and a second weighted parameter sub-matrix of the to-be-performed task; and
performing matrix aggregation on the first weighted parameter sub-matrices of all of the at least one to-be-performed task to obtain the first task coefficient matrix of the target task, and performing matrix aggregation on the second weighted parameter sub-matrices of all of the at least one to-be-performed task to obtain the first task coefficient matrix of the target task.

* * * * *